(12) United States Patent
Noll

(10) Patent No.: US 6,352,356 B1
(45) Date of Patent: Mar. 5, 2002

(54) ILLUMINATING DEVICE FOR A DISPLAY

(75) Inventor: Heinrich Noll, Gross-Umstadt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/425,842

(22) Filed: Oct. 21, 1999

(30) Foreign Application Priority Data

Oct. 26, 1998 (DE) .......................................... 198 49 244

(51) Int. Cl.[7] .............................................. F21K 27/00
(52) U.S. Cl. ..................... 362/260; 362/221; 362/29; 362/295; 362/802; 362/276; 362/92; 315/112; 315/117; 315/118; 315/169.1
(58) Field of Search ......................... 362/221, 29, 295, 362/802, 276, 260, 92; 315/169.1, 169.3, 112, 117, 118; 313/112, 115

(56) References Cited

FOREIGN PATENT DOCUMENTS

| DE | 3742245 | 6/1988 | | |
|----|---------|--------|---|---|
| DE | 4137260 | 5/1993 | | |
| GB | 2199645 | * | 7/1988 | ............. F21S/7/00 |
| JP | 6061345 | 4/1985 | | |
| JP | 63115134 | 5/1988 | | |
| JP | 2207221 | 8/1990 | | |
| JP | 5333319 | 12/1993 | | |
| JP | 07043680 | 2/1995 | | |
| JP | 10133177 | 5/1998 | | |

* cited by examiner

*Primary Examiner*—Thomas M. Sember
*Assistant Examiner*—Ali Alavi
(74) *Attorney, Agent, or Firm*—Martin A. Farber

(57) ABSTRACT

An electric heating element (4) designed for heating a fluorescent lamp (2) of an illuminating device for a display is arranged on a printed circuit board (5) at only a small spacing from the flourescent lamp (2). As a result, the fluorescent lamp (2) can be specifically heated in the predetermined regions, the production being simplified at the same time. At the same time, the mounting of the heating element (4) can be performed independently of the flourescent lamp (2), and an adaptation to fluorescent lamps (2) of arbitrary configuration can be undertaken without difficulty.

16 Claims, 1 Drawing Sheet

ILLUMINATING DEVICE FOR A DISPLAY

FIELD AND BACKGROUND OF THE INVENTION

The invention relates to an illuminating device for a display, in particular in a motor vehicle, having a fluorescent lamp and having a heating element for the fluorescent lamp.

Such illuminating devices having fluorescent lamps which can be heated by means of the heating element are used, for example, for background illumination of displays, in particular also LCD displays. In this case, it is chiefly the property of large-area and power-saving emission of light by fluorescent lamps which is advantageous. Such fluorescent lamps are fitted with a heating element in order to compensate brightness differences in different regions, which occur, in particular, in the case of low ambient temperatures and impair readability.

Heating elements for fluorescent lamps are already known which are designed as a winding arranged outside on the circumference of the fluorescent lamp. This permits specific heating of the fluorescent lamp to be achieved, it not being possible to exclude impairment of the emission of light by the fluorescent lamp. It is also disadvantageous that the winding simultaneously acts as a coil on the fluorescent lamp and complicates or impedes driving it. This can, for example, limit the dimming range.

Other embodiments are known in which the fluorescent lamp is provided on the outside with a heating foil.

The heating foil is laminated for this purpose onto the fluorescent lamp, for example on a side averted from the surface to be illuminated. A disadvantage in a heating element of such a design is the substantial outlay associated with attaching the heating foil. Again, the embodiment is limited to fluorescent lamps of comparatively large diameter.

Also known, furthermore, are fluorescent lamps which, for the purpose of avoiding the problems mentioned, are operated with overcurrent or are fitted with a double-walled glass.

SUMMARY OF THE INVENTION

The invention is based on the object of providing an illuminating device having a fluorescent lamp with an electric heating element in a particularly simple way. The aim in this case is for the heating element also to be suitable, in particular, for use with fluorescent lamps having only a small diameter.

According to the invention, this problem is solved wherein the heating element is arranged at a small spacing on a component adjacent to the fluorescent lamp. As a result, the heating element can be produced and mounted largely independently of the fluorescent lamp. The subassembly of the heating element and the fluorescent lamp are subsequently positioned in the immediate vicinity of a printed circuit board. Adaptation to the respective printed circuit board can easily be undertaken in this case by using a plurality of, or different heating elements. Here, there is no need for the heating element to be coordinated with the size and design of the fluorescent lamp, with the result that, in particular, it is also possible in this way to heat extremely thin or bent fluorescent lamps. A possible unfavorable influence on the drivability of the fluorescent lamp can be excluded in this case just like impairment of the emission of light.

It is also particularly advantageous when provided in addition to the first heating element are further heating elements which can be driven differently, depending on the type of fluorescent lamp. As a result, brightness differences in different sections of the fluorescent lamp can be compensated, and thus adaptations of the heating elements to the brightness differences characteristic of the respective fluorescent lamp, for example owing to heating elements of different output, can be undertaken.

It is particularly favorable in this case when the component is a printed circuit board. As a result, the heating element can be inserted on the printed circuit board in a single work operation together with further electronic subassemblies. The outlay on production is further reduced thereby, and possible sources of faults are excluded. As the same time, there is no difficulty in arranging different or additional heating elements on the printed circuit board, depending on the desired heating output.

The heating element can be any desired heating conductor or heating radiator. However, a development of the invention in which the heating element is a resistance heating element is particularly well suited. A heating element of such design quickly reaches it operating temperature and can be controlled without difficulty. In this case, the overall size and the production costs are comparatively low.

Particularly favorable in this case is an embodiment of the invention in which the heating element is connected to a control unit. It is thereby possible to process essential characteristics of the fluorescent lamp in the control unit, and convert them into a corresponding signal for the heating element. Overloading of the heating element or overheating of the fluorescent lamp can thereby be avoided.

It is particularly favorable in this case when the control unit is connected to a temperature sensor. As a result, overheating of the fluorescent lamp is just as reliably prevented as a power output which is too low at low ambient temperatures, which leads to a nonuniform emission of light.

It is also particularly advantageous in this case when the control unit is connected to a light-sensitive sensor. As a result, the heating element can be driven exactly, in accordance with the brightness of the fluorescent lamp detected by the sensor, by means of the control unit, and thus a desired emission of light via the fluorescent lamp can be achieved. A plurality of light sensors can, however, also detect brightness differences in various regions of the fluorescent lamp, and thereby permit individual heating elements to be driven specifically.

One embodiment of the invention is particularly advantageous by virtue of the fact that the heating element is limited to a predetermined, maximum temperature. A heating element of such a design automatically switches off upon reaching the specific maximum temperature, and thereby ensures a constant temperature for the fluorescent lamp. A control element is therefore not required.

A particularly advantageous development of the invention is achieved when the heating element is arranged in a chamber which is bounded by the fluorescent lamp and has only a low volume. As a result, only a small air volume bounded by the chamber need be heated. The desired temperature can therefore be reached substantially more quickly by comparison with an embodiment in which the heating element is arranged in a large-volume reflector. For this purpose, the chamber is arranged, for example, on the side averted from an observer, and bears directly against the circumference of the fluorescent lamp.

BRIEF DESCRIPTION OF THE DRAWING

The invention permits various embodiments. Two of these are represented in the drawing for the purpose of further illustrating the basic principle, and are described below. In the drawing

DETAILED DESCRIPTION OF THE PREFERRED EMBODIMENTS

Figure 1:
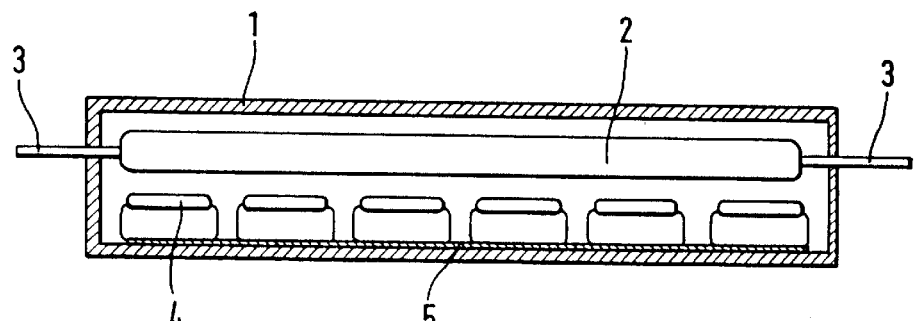
FIG. 1 shows a partially sectioned rear view of a fluorescent lamp having a plurality of heating elements.

FIG. 1 shows a partially sectioned rear view of a display housing 1 having a fluorescent lamp 2 inserted therein. The fluorescent lamp 2 has at its end in each case a connecting lead 3 to the electric power supply. Arranged below the fluorescent lamp 2 at a small spacing from the fluorescent lamp 2 are a plurality of heating elements 4 which are arranged next to one another and designed as resistance heating elements, and which can be individually driven by means of a control unit (not represented). The heating elements 4 make contact with a common printed circuit board 5, and can, in a departure from the embodiment represented, also have different spacings from one another. Moreover, the resistance heating elements can have a different electric resistance, depending on the arrangement of the respective heating element 4 with reference to the length of the fluorescent lamp 2. A uniformly bright emission of light by the fluorescent lamp 2 is ensured even in the case of different ambient temperatures by the specific heating of specific regions of the fluorescent lamp 2 by means of the heating elements 4.

Figure 2:
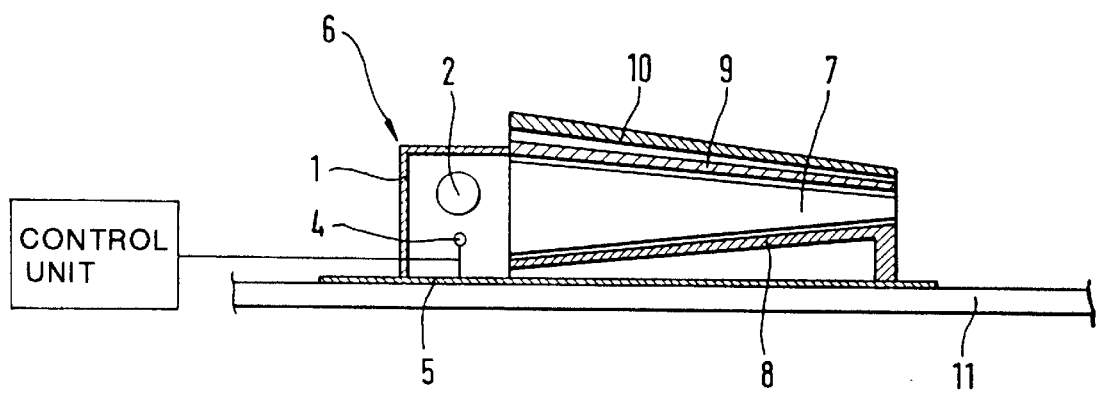
FIG. 2 shows the fluorescent lamp installed in a display, in a side view.

FIG. 2 shows the fluorescent lamp 2 inserted into the display housing 1 of a display 6, in a partially sectioned side view. The fluorescent lamp 2 is arranged together with the heating element 4 in the display housing 1, and can radiate directly into an adjoining optical conductor 7. The optical conductor 7 is bounded on its underside by a reflector 8 and on its top side by a diffusing panel 9. The light reaches the rear side of a display 10, which can be transilluminated, via this diffusing panel 9. The cross-sectional area of the optical conductor 7 decreases with increasing distance from the fluorescent lamp 2, with the result that the light exits uniformly through the diffusing panel 9. The printed circuit board 5 provided for making contact with the heating element 4 is arranged on an instrument panel 11 (represented only in part). In addition to the background illumination of the display 10, it is also possible for warning signals or dials to be illuminated actively by means of the fluorescent lamp 2.

Figure 3:
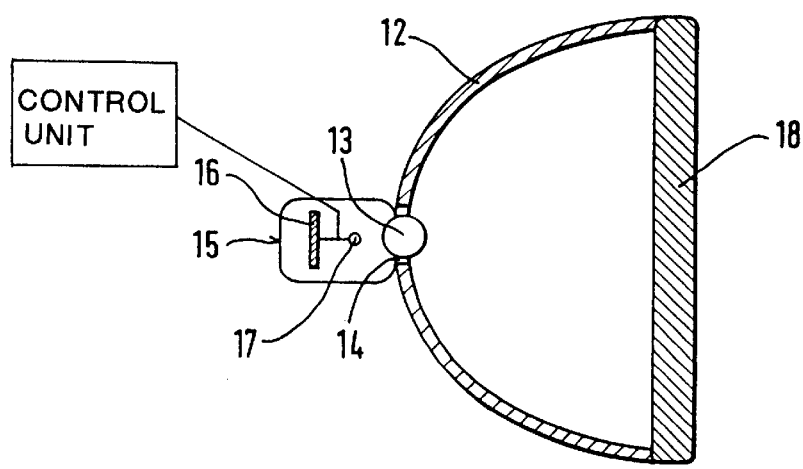
FIG. 3 shows a fluorescent lamp inserted into a reflector.

A further fluorescent lamp 13 inserted into a reflector 12 is shown in FIG. 3 in a partially sectioned side view. In this case, the fluorescent lamp 13 is inserted with a portion of its circumference into a cutout 14 in the reflector 12, and thus forms a rear chamber 15 together with a boundary surface. A heating element 17 connected to a printed circuit board 16 is inserted into this chamber 15. Owing to this arrangement, only a comparatively low space volume need be heated in order to heat the fluorescent lamp 13 to a desired operating temperature, and thus to achieve a uniform background illumination of display 18 (for example LCD) which can be transilluminated. The heating can be performed thereby substantially more quickly and with a lesser outlay on energy. At the same time, the heating element 17 continues not to influence the structural configuration of the reflector 12, thus opening up possibilities of application which present no problem and are versatile.

I claim:

1. An illuminating device for a display, having a fluorescent lamp and having a heating element for the fluorescent lamp, wherein the heating element (4, 17) is arranged on a component adjacent to the fluorescent lamp (2, 13) in a direction parallel with respect to an axis of the fluorescent lamp, wherein the heating element has different heating values in the direction of the axis of the flourescent lamp.

2. The illuminating device as claimed in claim 1, wherein the component is a printed circuit board (5, 16).

3. The illuminating device as claimed in claim 1, wherein the heating element (4, 17) is a resistance heating element.

4. The illuminating device as claimed in claim 1, wherein the heating element (4, 17) is connected to a control unit.

5. The illuminating device as claimed in claim 4, wherein the control unit is connected to a temperature sensor.

6. The illuminating device as claimed in claim 5, wherein the control unit is connected to a light-sensitive sensor.

7. The illuminating device as claimed in claim 1, wherein the heating element (4, 17) is limited to a predetermined, maximum temperature.

8. The illuminating device as claimed in claim 1, wherein the heating element (4, 17) is arranged in a chamber (15) which is bounded by the fluorescent lamp (2, 13) and has only a low volume.

9. An illuminating device as claimed in claim 1, wherein the display is for a motor vehicle.

10. An illuminating device as claimed in claim 1, wherein the axis of said flourescent lamp in linear.

11. An illuminating device for a display, having a fluorescent lamp and having a heating element for the fluorescent lamp, wherein the heating element (4, 17) is arranged on a component, and wherein the heating element comprises at least two heaters arranged adjacent to the fluorescent lamp (2, 13), each of said heaters being independently operable from each other.

12. The illuminating device as claimed in claim 11, wherein the heaters arranged in a direction parallel with respect to an axis of the fluorescent lamp.

13. The illuminating device as claimed in claim 11, wherein the axis of said flourescent lamp is linear.

14. The illuminating device as claimed in claim 11, wherein the heaters (4, 17) are resistance heating elements.

15. The illuminating device as claimed in claim 11, wherein the heaters (4, 17) are connected to a control unit.

16. The illuminating device as claimed in claim 11, wherein the heaters (4, 17) are limited to a predetermined, maximum temperature.

* * * * *